M. E. JONES.
CONVERTIBLE AGRICULTURAL IMPLEMENT.
APPLICATION FILED JULY 30, 1913.
1,214,041.
Patented Jan. 30, 1917.
2 SHEETS—SHEET 2.
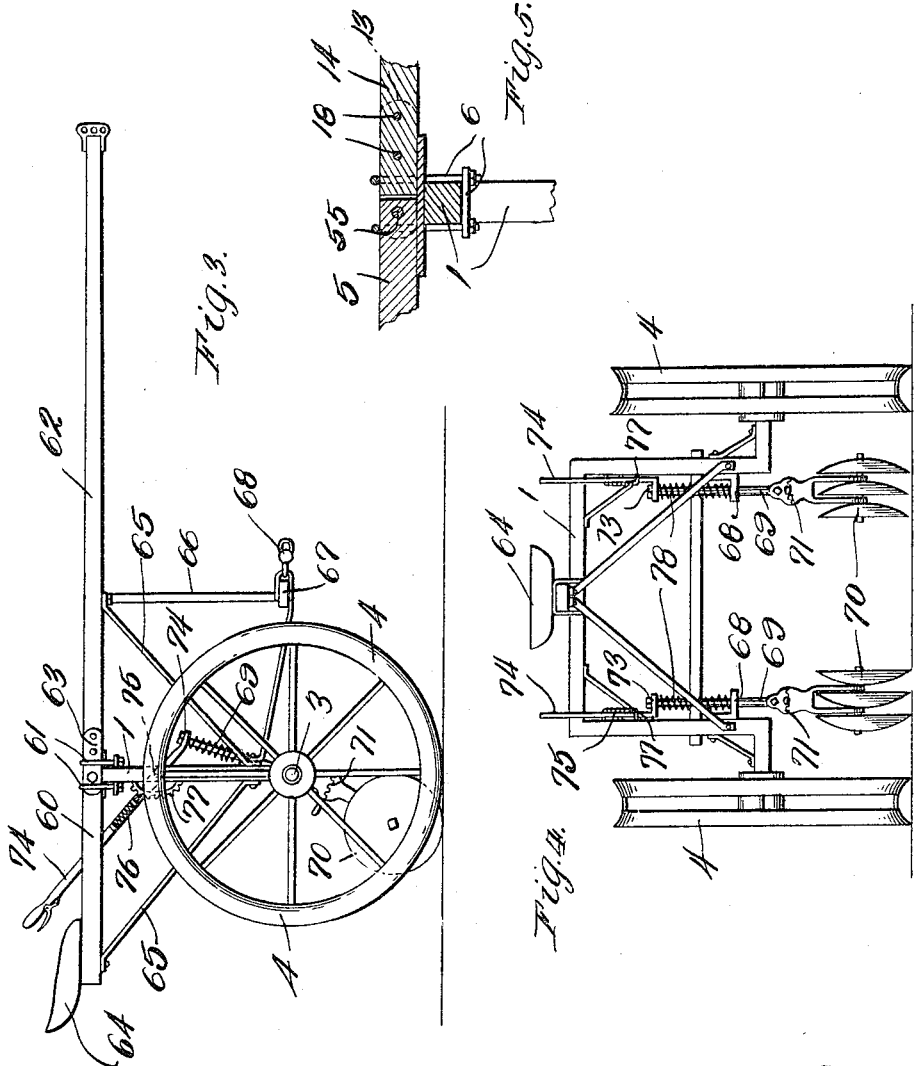

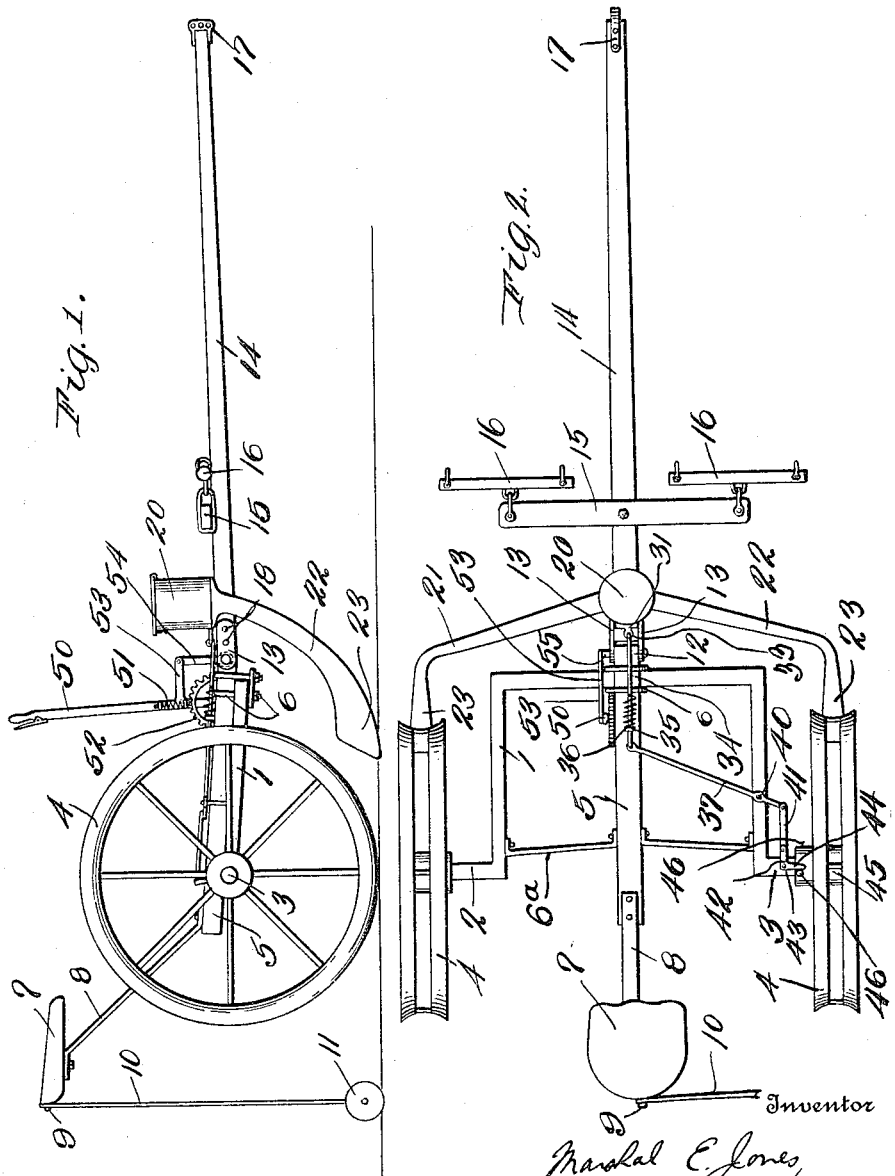

UNITED STATES PATENT OFFICE.

MARSHAL E. JONES, OF SPARTA, ILLINOIS.

CONVERTIBLE AGRICULTURAL IMPLEMENT.

1,214,041.   Specification of Letters Patent.   Patented Jan. 30, 1917.

Application filed July 30, 1913. Serial No. 782,148.

*To all whom it may concern:*

Be it known that I, MARSHAL E. JONES, a citizen of the United States, residing at Sparta, in the county of Randolph and State of Illinois, have invented certain new and useful Improvements in Convertible Agricultural Implements, of which the following is a specification.

This invention relates to a new and useful agricultural implement and has for its primary object the provision of a frame, for an agricultural implement, which may be used for a seeder or planter and with a few alterations be changed so as to be employed as a cultivator for the cultivation of corn or similar products.

Another object of this invention resides in the provision of a novel axle having a tongue and an auxiliary tongue associated therewith, novel clamping means being employed for maintaining both the tongue and the auxiliary tongue in substantial, rigid, yet removable engagement with the axle, when the axle is in either a vertical position, which provides a frame with which can be readily associated cultivator mechanism, or in a horizontal position, providing a frame with which may be associated a cotton planter.

With the foregoing and other objects in view, this invention consists in such novel features of construction, combination and arrangement of parts as will be hereinafter more fully described, illustrated in the accompanying drawings and claimed.

In describing this invention in detail reference will be had to the accompanying drawings wherein like characters of reference designate like or corresponding parts throughout the several views, and in which, Figure 1 is a side elevation of the improved agricultural implement showing the same employed as a planter or seeder; Fig. 2 is a top plan view of Fig. 1; Fig. 3 is a side elevation of the improved implement showing the same employed as a cultivator; Fig. 4 is a rear elevation of Fig. 3; Fig. 5 is a detailed sectional view through a portion of the frame.

Referring more particularly to the drawings, 1 designates a U shaped axle which has stub axles 2 and 3 formed integral with its free ends and extending outwardly substantially at right angles to the sides or legs of the U shaped axle 1. The stub axles 2 and 3 have the ordinary type of traction wheels 4 rotatably mounted thereupon.

In Figs. 1 and 2 of the drawings the U shaped axle 1 has an auxiliary tongue 5 connected thereto by means of a clevis 6 and suitable braces 6ª. The auxiliary tongue 5 has a seat 7 supported thereupon by means of a metallic strip 8 as is usual in the construction of agricultural implements so as to impart a certain amount of spring action to the seat. The seat 7 has pivotally connected to the rear side of the same as at 9 a rod 10 which rod has a disk 11 mounted upon its outer end. The disk 11 is a marker for marking a line within the soil to designate the position of the adjacent row of grain which is to be planted.

The auxiliary tongue 5 has connected to the sides of its end 12 a pair of plates 13 which plates are in turn connected to a tongue 14. The tongue 14 is of the ordinary type of construction of tongue employed in various types of agricultural or similar implements and has a double tree 15 connected thereto which double tree carries the swingle trees 16. The outer end of the tongue 14 has an ordinary clevis 17 or any other suitable means for attaching the same to the harness mounted thereupon. The tongue 14 is connected to the plates 13 by means of pins 18 which are inserted through openings in the plates and the end of the tongue. The tongue 14 has mounted thereupon near its inner end, which is connected to the plates 13, a seed containing hopper 20 which has shoes 21 and 22 leading therefrom so that their flared and opened ends 23 are placed directly in front of the traction wheels 4. The hopper 20 has a cover or lid 24 hingedly connected to its upper end so that grain of various types such as corn, beans or the like may be put into the interior of the hopper.

The dispensing plate 31 has an eyelet 33 connected to its end which protrudes beyond the side of the hopper 20 which eyelet, has a rod 34 connected thereto. The rod is slidably mounted in a bearing or strap 35 which is connected to the auxiliary tongue 5. The bearing 35 has one end of a coil spring 36 seated in an opening formed therein and the spring 36 is wound about the rod 34 having its other end mounted in an opening extending through the rod 34. The rod 34 has a second rod 37 pivotally connected at 38 thereto and the rod 37 has an enlargement 39 formed intermediate its ends. A pin 40 is inserted through an opening in the enlargement 39 of rod 37 and is also inserted into one of the sides or legs of the U shaped axle 1, pivotally connecting the rod 37 to the axle 1. The outer end of the rod 37 which extends beyond the leg of the axle 1 has pivotally connected thereto a link 41. The link 41 is in turn pivotally connected to an angle arm 42 which angle arm is pivotally connected at 43 to the stub axle 3. The arm 44 of the angle arm 42 extends outwardly from the link 41 and substantially at right angles to the same being disposed directly over the center of the hub 45 of one of the traction wheels 4. The hub 45 has a plurality of pins 46 mounted thereupon at various intervals about its circumference which pins engage the arm 44 of the angle arm 42 and consequently operate the rod 37 upon its pivotal point 40 and the rod 34, moving the plate 31 inwardly and causing the openings 32 and 26 to coincide thus allowing the grain to fall through the openings and shoes 21 and 22 upon the ground directly in front of the traction wheels 4. Immediately after one of the pins 46 has passed the arm 44 the spring 36 will draw the plate 31 outwardly thereby preventing the grain from falling therethrough.

A lever 50 is pivotally connected to the auxiliary tongue 5 and the dog mechanism 51 carried thereby coöperates with the quadrant 52 which is carried by the auxiliary tongue 5. The lever 50 has an arm 53 securely connected thereto which arm is in turn connected to a link 54. The link 54 extends downwardly and has its lower enlarged end mounted upon the pin 55 by means of which the plates 13 are connected to the auxiliary tongue 5. The lever 50 and the mechanism co-acting therewith form means for altering the elevation of the tongue 14 and consequently the seed dispensing mechanism carried thereby.

When it is desired to use the axle of the implement for a cultivator the tongue 14 and the auxiliary tongue 5 and the levers for actuating the seed dispensing mechanism are disconnected from the U shaped axle 1 and the axle is moved so that it will extend upwardly having its connected end uppermost. An auxiliary tongue 60, the same as numbered 5 in the planter, is then connected to the upper connected end of the axle 1 by means of a clevis 61 and has a tongue 62 formerly designated 14 connected thereto by means of plates 63 which were the plates 13. A seat 64 is mounted upon the rear end of the auxiliary tongue 62 and the tongue is braced by suitable brace rods 65. Connected to the under surface of the tongue 62 and extending downwardly therefrom is a brace 66 which has a double tree 67 connected thereto. The double tree 67 carries the usual swingle trees 68 used for the hitching of horses to the implement. When the U shaped axle 1 is in an upright position a pair of angle irons 68 are connected to the inner of its legs. The angle irons 68 have rods 69 slidably mounted in openings extending therethrough. The rods 69 have a plurality of cultivating plates 70 connected to their lower ends by means of swivel joints 71. The cultivator blades 70 may be, as is shown in Figs. 3 and 4 of the drawings, disks or should it be desired they may be of the ordinary type of cultivator shovel or plow the same being optional with the person using or manufacturing the device.

The upper ends of the rods 69 have the angled or forked ends 73 of levers 74 secured thereto. The levers 74 are pivotally connected at 75 to the U shaped axle 1 and the ordinary dog or catching mechanism 76 which is carried by the levers 74 coact with quadrants 77 which are carried by the U shaped axle 1 for the raising or lowering of the cultivating shovels or disks into or out of an operative position. The rods 69 have coil springs 78 mounted thereabout between the angle irons 68 and the ends 73 of the levers 74.

In practical fields, certain minor features of construction, combination and arrangement of parts may necessitate alterations to which the patentee is entitled provided such alterations are comprehended within the scope of what is claimed.

What is claimed is:

1. In a convertible agricultural implement, a U-shaped axle, a tongue associated with the axle, and clamping means adjustably associated with the tongue and to the axle for removably holding the axle either vertically or horizontally in relation to the ground for facilitating the adjustment of various implements.

2. In a convertible agricultural implement frame, a U-shaped axle, supporting wheels operatively mounted thereon, a tongue associated with the axle, an auxiliary tongue detachably associated with the tongue and axle, clamping means for detachably holding both of the tongues to the frame when the frame is in a vertical position, and for holding the auxiliary tongue to the frame when the frame is in a horizontal position.

In testimony whereof I affix my signature in presence of two witnesses.

MARSHAL E. JONES.

Witnesses:
JAMES H. McGUIRE,
HARRY L. McGUIRE.